(12) United States Patent
Jehle et al.

(10) Patent No.: US 11,981,318 B2
(45) Date of Patent: May 14, 2024

(54) METHOD FOR OPERATING AN IDLING CONTROL DEVICE, AN IDLING CONTROL DEVICE AND A MOTOR VEHICLE

(71) Applicant: Vitesco Technologies GmbH, Hannover (DE)

(72) Inventors: Martin Jehle, Munich (DE); Matthew Ward, Munich (DE)

(73) Assignee: Vitesco Technologies GmbH (DE)

( * ) Notice: Subject to any disclaimer, the term of this patent is extended or adjusted under 35 U.S.C. 154(b) by 683 days.

(21) Appl. No.: 17/262,343

(22) PCT Filed: Jul. 24, 2019

(86) PCT No.: PCT/EP2019/069877
§ 371 (c)(1),
(2) Date: Jan. 22, 2021

(87) PCT Pub. No.: WO2020/020926
PCT Pub. Date: Jan. 30, 2020

(65) Prior Publication Data
US 2021/0237711 A1 Aug. 5, 2021

(30) Foreign Application Priority Data
Jul. 25, 2018 (DE) ............ 10 2018 212 358.6

(51) Int. Cl.
*B60W 20/15* (2016.01)
*B60K 6/26* (2007.10)
(Continued)

(52) U.S. Cl.
CPC ............. *B60W 20/15* (2016.01); *B60K 6/26* (2013.01); *B60K 6/485* (2013.01); *B60W 10/06* (2013.01);
(Continued)

(58) Field of Classification Search
CPC ...... B60W 20/15; B60W 10/06; B60W 10/08; B60W 30/1882; B60W 30/18054;
(Continued)

(56) References Cited

U.S. PATENT DOCUMENTS 5,934,396 A 8/1999 Kurita
6,109,237 A 8/2000 Pels et al.
(Continued)

FOREIGN PATENT DOCUMENTS

CN 107054343 A 8/2017
DE 19704153 A1 8/1998
(Continued)

OTHER PUBLICATIONS

International Search Report and Written Opinion for International Application No. PCT/EP2019/069877, dated Nov. 20, 2019, 10 pages.
(Continued)

*Primary Examiner* — Hai H Huynh
(74) *Attorney, Agent, or Firm* — Buchanan Ingersoll & Rooney PC

(57) ABSTRACT

A method for operating an idling control device for a motor vehicle. The idling control device specifies a total setpoint torque including a setpoint torque of an electric motor and a setpoint torque of an internal combustion engine which interacts with the electric motor, and sets the setpoint torques by respective control paths. In a first operating mode the idling control device sets a requested total setpoint torque only via the control path of the internal combustion engine by at least one control intervention, and in a second operating mode the idling control device sets the requested total setpoint torque by at least one control intervention via the control path of the internal combustion engine and by at least one control intervention via the control path of the electric (Continued)

motor. The control interventions via the control path of the internal combustion engine consist of at least one predetermined slow control intervention, and the control interventions in the control path of the electric motor consist of at least one predetermined fast control intervention, which intervenes with a higher rate of change over time than the at least one predetermined slow control intervention.

15 Claims, 3 Drawing Sheets

(51) Int. Cl.
    *B60K 6/485*     (2007.10)
    *B60W 10/06*     (2006.01)
    *B60W 10/08*     (2006.01)
    *B60W 30/188*     (2012.01)

(52) U.S. Cl.
    CPC ........ *B60W 10/08* (2013.01); *B60W 30/1882* (2013.01); *B60K 2006/268* (2013.01); *B60W 2710/0666* (2013.01); *B60W 2710/083* (2013.01); *B60Y 2200/92* (2013.01); *B60Y 2300/1882* (2013.01)

(58) Field of Classification Search
    CPC ... B60W 2710/0666; B60W 2710/083; B60W 2710/244; B60K 6/26; B60K 6/485; B60K 2006/268; B60Y 2300/1882; B60Y 2200/92; F02D 2200/1002; F02D 2250/22; F02D 2250/24; F02D 31/003; F02D 31/008; F02D 41/16; Y02T 10/62
    USPC ............ 123/339.11; 701/103, 110, 112, 113; 180/65.21, 65.28
    See application file for complete search history.

(56) References Cited

U.S. PATENT DOCUMENTS

| | | | |
|---|---|---|---|
| 8,532,852 B2 | 9/2013 | Falkenstein | |
| 8,606,488 B2 | 12/2013 | Falkenstein | |
| 8,781,662 B2 | 7/2014 | Park | |
| 8,989,931 B2 | 3/2015 | Seel | |
| 9,090,251 B2 | 7/2015 | Watanabe et al. | |
| 9,216,735 B2 * | 12/2015 | Watanabe | ............. B60W 20/00 |
| 9,771,058 B2 | 9/2017 | Choi et al. | |
| 10,086,820 B2 | 10/2018 | Eo et al. | |
| 2011/0041802 A1 | 2/2011 | Kar et al. | |
| 2011/0112708 A1 | 5/2011 | Fassnacht | |
| 2012/0303197 A1 | 11/2012 | Seel | |
| 2013/0204478 A1 | 8/2013 | Watanabe et al. | |

FOREIGN PATENT DOCUMENTS

| | | |
|---|---|---|
| DE | 102004062012 A1 | 7/2006 |
| DE | 102006039400 A1 | 3/2008 |
| DE | 102007059869 A1 | 6/2009 |
| DE | 102009047618 A1 | 6/2011 |
| DE | 102012014462 A1 | 1/2014 |
| DE | 102016217569 A1 | 3/2018 |
| EP | 2873576 A1 | 5/2015 |
| EP | 3272607 A1 | 1/2018 |
| JP | 2005054858 A | 3/2005 |
| JP | 2012087639 A | 5/2012 |
| JP | 2013189136 A | 9/2013 |
| KR | 20130064537 A | 6/2013 |
| KR | 20160036334 A | 4/2016 |

OTHER PUBLICATIONS

International Search Report and Written Opinion for International Application No. PCT/EP2019/069877, dated Nov. 20, 2019, 15 pages (German).
Chinese Office Action for Application No. 201980062932.X, dated Aug. 9, 2022 with translation, 22 pages.
Korean Notice of Allowance for Korean Application No. 10-2021-7005715, dated May 11, 2023 with translation, 4 pages.

* cited by examiner

METHOD FOR OPERATING AN IDLING CONTROL DEVICE, AN IDLING CONTROL DEVICE AND A MOTOR VEHICLE

CROSS REFERENCE TO RELATED APPLICATIONS

This application is the U.S. National Phase Application of PCT International Application No. PCT/EP2019/069877, filed Jul. 24, 2019, which claims priority to German Patent Application No. 10 2018 212 358.6, filed Jul. 25, 2018, the contents of such applications being incorporated by reference herein.

FIELD OF THE INVENTION

The invention relates to a method for operating an idling control device for a motor vehicle, the idling device and a motor vehicle equipped with the idling device.

BACKGROUND OF THE INVENTION

The speed control of the internal combustion engine when idling (also called idling control device) is a demanding control problem, especially with gasoline engines, and under certain circumstances also with diesel engines, because the manipulated variables used by the internal combustion engine are subject to limitations. The control is generally carried out on a torque basis in order to be more independent of the influencing variables of the torque and their interaction. The influencing variables can be, for example, the air mass, the ignition angle and the lambda value in a gasoline engine. The influencing variables of the diesel engine can be an injection quantity and the pattern of the injection. The idle controller outputs one or more torque requests, which can be input at different points of the torque coordination. These can be additively acting torque requests or a required minimum torque. These can act on different manipulated variables. A distinction is made between the so-called fast path and the slow path.

In the case of a gasoline engine, the fast path usually relates to the ignition angle and, in the case of a diesel engine, to an injection quantity. The so-called slow path is implemented by influencing the air volume and the charge pressure or other manipulated variables with a longer delay or a lower rate of change over time. The fast path can reach upper or lower limits for the torque which can be realized.
  a) Gasoline engine: The upper limit is given by the so-called base torque, which depends on the earliest possible ignition point. The lower limit is formed by the combustion limit or thermal limits, which depend on the latest possible ignition point. The limits relate in each case to the charge currently absorbed in the engine (for example mg/stroke), which can only be changed with a delay or a lower rate of change over time.
  b) Diesel engine: The upper limit is given by the soot limit, which depends on the highest injection quantity with regard to emissions, etc. The lower limit is given by a minimum injection quantity to avoid "blue" soot. "Blue" soot occurs with poor combustion, particularly at low ambient pressure and a cold engine, due to a long delay of the start of combustion.

While the limits of the diesel engine are only reached under particular conditions when idling, the upper limit of a gasoline engine is always of great importance, since low fuel consumption can only be achieved with a small distance from this limit (so-called torque reserve).

Such a small distance, however, reduces the possibility of rapid torque-increasing interventions in the event of malfunctions, which can occur, for example, with suddenly acting mechanically coupled consumers such as the air conditioning compressor. In the case of gasoline engines, the idling control device is generally operated with a torque reserve, which can cause a considerable increase in consumption when idling.

On the other hand, the torque reserve when idling has the advantage that it increases the charging of the internal combustion engine, which is necessary to make stable combustion possible, in particular in engines which are optimized in respect of friction. Without a torque reserve, unstable combustion can occur.

Electric motors can advantageously be used for idling control devices in hybrid systems because of their high reaction speed. The quickly effective positive torque of an electric motor is not only suitable purely for an idling control device, but also for assistance in starting situations and in situations where the engine is about to die. On the other hand, positive torque interventions by electric motors are associated with high energy expenditure because, except in a plug-in hybrid, the electrical energy required for this must first be generated from the energy of the fuel, taking into account the efficiency chain. In particular in mild hybrid systems or micro-hybrid systems, the available torque of the electric motor is also limited. This is the case in particular when the state of charge of the battery is low, so that it is not always possible to fully control the idling using the electric motor.

SUMMARY OF THE INVENTION

An aspect of the invention aims to enable coordinated use of the idling control device by an internal combustion engine and an electric motor, the best operating mode being selected as a function of a predetermined operating situation.

An aspect of the invention provides a method for operating an idling control device for a motor vehicle. The idling control device specifies a total setpoint torque comprising a setpoint torque of an electric motor and a setpoint torque of an internal combustion engine which interacts with the electric motor. The idling control device sets the setpoint torques in the electric motor and the internal combustion engine by means of respective control paths.

In a first operating mode the idling control device sets a requested total setpoint torque only via the control path of the internal combustion engine by means of at least one control intervention.

In a second operating mode the idling control device sets the requested total setpoint torque by means of at least one control intervention via the control path of the internal combustion engine and by means of at least one control intervention via the control path of the electric motor. The at least one control intervention via the control path of the internal combustion engine comprises at least one predetermined slow control intervention, and the at least one control intervention in the control path of the electric motor comprises at least one predetermined fast control intervention. The at least one predetermined fast control intervention intervenes with a higher rate of change over time than the at least one predetermined slow control intervention.

In other words, a method is provided for the idling control device for setting the total setpoint torque. The idling control device specifies the total setpoint torque, which is composed of the setpoint torque of the electric motor and the setpoint torque of an internal combustion engine. To set the total setpoint torque, the setpoint torque of the electric motor is set by means of the control path of the electric motor and the setpoint torque of the internal combustion engine is set by means of the control path of the internal combustion engine.

In order to set the requested total setpoint torque in the first operating mode, the at least one control intervention by the idling control device is carried out only via the control path of the internal combustion engine. Thus, the requested total setpoint torque is set only by means of a control intervention via the control path of the internal combustion engine. As a result, a different setpoint torque of the internal combustion engine is set, which results, together with the setpoint torque of the electric motor, in the requested total setpoint torque.

In order to set the requested total setpoint torque in the second operating mode, the at least one control intervention takes place via the control path of the internal combustion engine, this comprising the at least one slow control intervention. In addition, the at least one control intervention also takes place via the control path of the electric motor, this comprising the at least one fast control intervention. The requested total torque is thus set at least by means of the one slow control intervention via the control path of the internal combustion engine and the at least one fast control intervention via the control path of the electric motor. The at least one fast control intervention acts with a higher rate of change over time on the total torque than the at least one slow control intervention. The requested total setpoint torque is thus set by changing the setpoint torque of the internal combustion engine and the setpoint torque of the electric motor.

An aspect of the invention provides the advantage that the idling control device can be operated in two different operating modes.

For example, it is possible for the idling control device to determine the total setpoint torque. The idling control device can for example comprise a microprocessor or a microcontroller. The total setpoint torque can be composed of the setpoint torque of the electric motor and the setpoint torque of the internal combustion engine. The electric motor and the internal combustion engine can interact, for example, in a hybrid arrangement in a motor vehicle and, for example, drive a crankshaft. The internal combustion engine can be, for example, a gasoline engine or a diesel engine. The idling control device can be configured to detect a current actual total torque, for example that of a crankshaft, by means of a sensor. The idling control device can be configured to receive or detect a respective actual torque of the internal combustion engine and of the electric motor. The idling control device can set the respective setpoint torques of the internal combustion engine and of the electric motor via respective control paths. It can be provided that the setpoint torque of the internal combustion engine is set, for example, via control paths for controlling the filling of a cylinder, an ignition point or an injection quantity. The electric motor can be controlled, for example, via a control path of an operating voltage. The requested total torque can be, for example, a total torque that is requested and differs from the total setpoint torque at the start of the method. The requested total torque can be set by means of control interventions in the control paths of the electric motor and of the internal combustion engine. The control interventions can include fast and slow control interventions, the fast control interventions (e.g. proportional or differentiating controller components) generally causing a greater change in the setpoint torque in a short period of time than the slow control interventions (e.g. integrating controller components). In the case of the internal combustion engine, the control interventions can be implemented via a fast or slow control path. The fast control path acts, for example, on a change in the ignition angle or the injection quantity into the cylinder. The slow control path has an effect on a boost pressure, for example, and has a longer delay or a lower rate of change over time until controller interventions change the total torque. The fast control intervention can be, for example, the PD component of a controller, and the slow control intervention can be the I component. Both parts can immediately begin to change the torque setpoint value. A PD component can generally cause a greater change in torque in a shorter time than an I component.

The idling control device can calculate and set the total torque, which is, for example, lower than a requested total torque. In order to achieve the requested total torque, the idling control device can make control interventions, wherein, for example, manipulated variables in a control path, such as the ignition angle, can be changed.

The idling control device can be operated in two operating modes. In the first operating mode it can be provided that the requested total setpoint torque is set only by means of control interventions via the control path of the internal combustion engine. The control interventions in the control path of the internal combustion engine can include the slow control interventions and the fast control interventions.

In the second operating mode it can be provided that the requested total setpoint torque is implemented by means of the at least one control intervention via the control path of the internal combustion engine and by means of the at least one control intervention via the control path of the electric motor. It can be provided that the at least one control intervention in the control path of the internal combustion engine comprises at least one slow control intervention and the at least one control intervention in the control path of the electric motor comprises at least one predetermined fast control intervention. It can be provided, for example, that in the second operating mode the at least one fast control intervention takes place via the control path of the electric motor and the at least one slow control intervention takes place via the control path of the internal combustion engine. Coordinated use of control interventions can thus take place in the second operating mode, control interventions with a lower rate of change being implemented by means of the internal combustion engine and control interventions with a higher rate of change, which require high dynamics, being implemented by means of the electric motor. It can thus be possible to enable an energy-efficient operating mode with fast control interventions without a torque reserve.

A further development of the invention provides that the internal combustion engine is operated in the first operating mode with a predetermined first torque reserve, and the internal combustion engine is operated in the second operating mode without a torque reserve or with a predetermined second torque reserve, the predetermined second torque reserve being smaller than the predetermined first torque reserve.

In other words, it is provided that the internal combustion engine is controlled by the idling control device in such a way that the internal combustion engine has a predetermined torque reserve. It is provided that the internal combustion engine has the first torque reserve in the first operating mode and has the second torque reserve or no torque reserve in the second operating mode. The torque reserve of the internal combustion engine in the first operating mode is greater here than the torque reserve of the internal combustion engine in the second operating mode.

This has the advantage that it is possible to operate the internal combustion engine both with a torque reserve and without a torque reserve. The latter enables more energy-efficient operation of the internal combustion engine.

It can be provided, for example, that the torque reserve of the internal combustion engine in the first operating mode is provided by excess charge in combination with a retarded ignition point and in the second operating mode the internal combustion engine is operated with an ignition point that is optimal for a current charge. The internal combustion engine can thus be operated at a greater distance from an upper limit in the first operating mode than in the second operating mode. In the second operating mode, the lower torque reserve can be compensated by the electric motor.

A further development of the invention provides that in the second operating mode the setpoint torque of the electric motor has at least one predetermined basic generator torque, and the setpoint torque of the internal combustion engine has at least the basic generator torque as the setpoint torque when the motor vehicle is in a predetermined idling mode.

In other words, it is provided that at least the predetermined basic generator torque is absorbed by the electric motor in the second operating mode. In accordance with the basic generator torque absorbed by the electric motor, the internal combustion engine provides the setpoint torque which comprises at least the basic generator torque. This takes place when the motor vehicle is in the predetermined idling mode.

This results in the advantage that stable engine operation is made possible by means of the setting of a basic generator torque and a corresponding setting of the setpoint torque of the internal combustion engine, with electrical energy being provided by the electric motor at the same time.

It may be that stable operation of the internal combustion engine is only possible with a certain torque. In order to enable the internal combustion engine to operate in a stable manner at the total setpoint torque, provision can be made to set the setpoint torque of the internal combustion engine to a value which can be greater than the total torque. In order to provide the total torque, it may therefore be necessary to combine the setpoint torque of the internal combustion engine with a negative torque. The negative torque can be provided by the electric motor here. For this purpose, the electric motor can be operated as an electric generator in the second operating mode and can take up the basic generator torque. The setpoint torque of the electric motor can be selected such that at least the predetermined basic generator torque is taken up by the electric motor. This can take place, for example, when the motor vehicle is in the predetermined idling mode. The predetermined idling mode can be a predetermined position of the accelerator pedal or of a clutch of the motor vehicle.

A further development of the invention provides that the idling control device determines the predetermined basic generator torque as a function of a predetermined setpoint operating point of the internal combustion engine.

In other words, the generator torque is set by the idling control device in such a way that the internal combustion engine is operated at a predetermined setpoint operating point.

This has the advantage that it is possible to select an operating point of the internal combustion engine for the requested setpoint total torque.

The internal combustion engine can, for example, have a characteristic which has smooth, quiet or, for example, energy-efficient operation at certain operating points. It may be possible that the predetermined operating point can only be reached with certain values of the torque of the internal combustion engine. Characteristic curves or characteristic diagrams which indicate the operating points of the internal combustion engine as a function of the torque and other parameters of the internal combustion engine can be stored in the idling control device. If it is necessary to operate the internal combustion engine at a predetermined operating point, it can be provided that the idling control device reads the required setpoint torque of the internal combustion engine for the predetermined operating point from the characteristic curve or the characteristic diagram. From the setpoint torque of the internal combustion engine and the requested total setpoint torque, the idling control device can calculate a generator torque which, in combination with the setpoint torque of the internal combustion engine, provides the requested total setpoint torque.

A further development of the invention provides that the internal combustion engine is operated in the first operating mode and in the second operating mode with the same charge quantity per combustion cycle when the motor vehicle is in the predetermined idling mode.

In other words, a cylinder of the internal combustion engine is supplied with the same charge quantity both in the first operating mode and in the second operating mode when the motor vehicle is in the predetermined idling mode.

A further development of the invention provides that the idling control device specifies a setpoint state of charge of an electrical energy store, the setpoint state of charge being higher in the second operating mode than in the first operating mode.

In other words, the idling control device sets a setpoint state of charge in an electrical energy store. The setpoint state of charge is selected by the idling control device as a function of the operating mode. In the second operating mode, the setpoint state of charge has a higher value than in the first operating mode.

This results in the advantage that the energy store can absorb a larger amount of energy in the second operating mode, which enables the idling control device to operate for a longer period in the second operating mode.

It can be provided, for example, that in the second operating mode a low-voltage battery as an electrical energy storage device is charged from a high-voltage system to a higher state of charge than in the first operating mode. This can take place in particular when the state of charge of the high-voltage system exceeds a predetermined threshold. This can represent an energy management aspect, because if the state of charge of a high-voltage battery increases too much, charging of a 12 V battery can be triggered in order to avoid the idling control device having to switch back to the first operating mode again due to a lack of storage reserves.

A further development of the invention provides that the first operating mode and the second operating mode are assigned respective predetermined operating states of the motor vehicle, and the idling control device operates in the first operating mode or in the second operating mode as a function of the predetermined operating states of the motor vehicle.

In other words, the respective assigned operating mode is selected by the idling control device when the motor vehicle is in the respective predetermined operating state. Both the first operating mode and the second operating mode are assigned respective predetermined operating states of the motor vehicle. The idling control device then operates according to the selected operating mode.

This has the advantage that the respectively preferred operating mode can be assigned to respective operating states of the motor vehicle.

It can be provided, for example, that the predetermined operating states of the motor vehicle include a predetermined state of charge of one or more electrical energy stores. It can be provided that the idling control device works in the second operating mode when the state of charge of one or more electrical energy stores of the motor vehicle is within a predetermined range. Another operating state of the motor vehicle can, for example, be an operating mode for auxiliary units. It can be provided, for example, that the idling control device works in the second operating mode when a predetermined torque output of the internal combustion engine is required for operating one or more mechanically driven auxiliary units and/or for supplying electrical consumers by means of the electric motor. The mechanically driven unit can, for example, be an air conditioning compressor of an air conditioning system. A further operating state of the motor vehicle can be a predetermined state of an exhaust gas treatment system. It can be provided that the idling control device only works in the second operating mode when no increased exhaust gas temperature is required for heating up an exhaust gas treatment system. The second operating mode can also be assigned to predetermined states of the drive train. It can be provided that the 2nd operating mode is activated only in predetermined states of the drive train. This can be the case, for example, with an open drive train or defined gears. It can be provided that the second operating mode is activated only if a predetermined time has elapsed since the internal combustion engine was started. It can be provided that the second operating mode is activated only at the beginning of an activation phase of the idling control device. This can minimize possible noticeable effects when transitioning between the operating modes.

A development of the invention provides that the second operating mode is activated or kept active when a predetermined starting situation of the motor vehicle and/or a predetermined situation of an imminent shutdown of the internal combustion engine is detected.

In other words, it is provided that the idling control device is operated in the second operating mode when the predetermined starting situation of the motor vehicle and/or a predetermined situation of an impending starting of the internal combustion engine is detected.

This has the advantage that the internal combustion engine is relieved in situations in which it has too little torque.

For example, it can be provided that the predetermined starting situation of the motor vehicle is detected by means of a sensor by measuring an accelerator pedal position, whereby the idling control device is placed in or remains in the second operating mode. It can also be provided that the idling control device is placed in the second operating mode when the predetermined situation of an imminent shutdown of the internal combustion engine is detected. The predetermined situation of an imminent shutdown of the internal combustion engine can be, for example, when the engine speed falls below a predetermined value.

One development of the invention provides that the idling control device uses parameters which are dependent on the respective operating mode.

In other words, the first operating mode and the second operating mode are assigned respective parameters which are used by the idling control device when the respective operating mode is active.

This provides the advantage that the electric motor and the internal combustion engine are actuated with parameters that are adapted to the respective operating mode.

For example, it can be provided that the first operating mode and the second operating mode are each assigned different values. In the first operating mode, for example, other controller constants or controller characteristic diagrams of a proportional, differentiating and/or integrating controller component can be used than in the second operating mode.

A further development of the invention provides that the idling control device is operated in a predetermined transition mode when the operating mode changes, wherein the values of the torque reserve and/or the parameters used by the idling control device change constantly from those of the original operating mode to those of the following operating mode. In addition or as an alternative to this, control interventions are multiplied by means of respective activity factors, wherein the activity factors constantly change from those of the original operating mode to those of the following operating mode.

In other words, the idling control device is operated in a predetermined transition mode when the idling control device changes from one operating mode to the other operating mode. During the transition mode, the idling control device uses constantly changing values of the torque reserve and/or of the parameters. The change takes place through a continuous transition of the values based on the values of the operating mode set before the change to the values of the operating mode set after the change. In addition or as an alternative to this, there is a constant change in the control interventions, with a continuous transition of the control interventions taking place by means of respective activity factors which are multiplied by the control interventions. During the transition mode, the values of the respective activity factors change constantly from those of the original operating mode to those of the following operating mode.

This provides the advantage that abrupt changes during a change in the operating mode are prevented.

Provision can be made, for example, for the idling control device to carry out a change from the first operating mode to the second operating mode during the method. The idling control device can terminate the operation in the first operating mode and continue in the transition mode. The transition mode can extend over a predetermined period of time. During the period, values relating to the torque reserve and/or the parameters as a function of time can be continuously transferred from the values of the first operating mode to the values of the second operating mode. At the end of the transition mode, the values relating to the torque reserve and/or the parameters can match those of the second operating mode. The transition mode can then be ended and the second operating mode activated. In the transition mode, there can be a continuous transition of an activity state of the respective control interventions. It can be provided that the control interventions that are only active in one of the two operating modes are activated or deactivated.

A development of the invention provides that in the second operating mode the idling control device calculates the fast control interventions in a time-synchronous manner and in the first operating mode in an angle-synchronous manner with an angle of a drive torque of the motor vehicle.

In other words, the fast control interventions in the second operating mode are carried out by the idling control device with a constant repetition rate over time and in the first operating mode with a constant repetition rate as a function of the angle of the drive element.

This provides the advantage that the calculation intervals can be optimized for the operating mode.

It can be provided, for example, that the calculation of the fast control interventions in the second operating mode can be carried out, for example, with a constant repetition rate, for example 1 calculation per 10 ms. In the first operating mode, the calculation can be calculated angle-synchronously with the angle of a drive element of the motor vehicle. The drive element can be, for example, a crankshaft or a wheel axle. The repetition rate can be implemented in proportion to the engine speed of the internal combustion engine, in particular with a segment-synchronous calculation of the fast control interventions. The duration of a work cycle of the internal combustion engine can be, for example, 2 revolutions per number of cylinders. A segment can correspond here to the duration for 2 revolutions of the internal combustion engine divided by the number of cylinders.

A further development of the invention provides that in the second operating mode the idling control device converts a proportional and/or differentiating component into the control path of the electric motor by means of the at least one control intervention.

In other words, in the second operating mode the idling control device performs proportional and/or differentiating control into the control path of the electric motor by means of the at least one control intervention.

A further development of the invention provides that in the second operating mode the idling control device converts an integrating component into the control path of the internal combustion engine by means of the at least one control intervention.

In other words, in the second operating mode the idling control device performs integrating control into the control path of the internal combustion engine by means of the at least one control intervention.

A further development of the invention provides that in the second operating mode the idling control device converts the integrating component into the control path of the internal combustion engine by means of control interventions and into the control path of the electric motor by means of control interventions, wherein a division ratio between the control interventions into the control path of the internal combustion engine and the control interventions into the control path of the electric motor is dependent on a dynamic value which describes a rate of change over time of the integrating component within a predetermined preceding time window.

In other words, the dynamic value is determined, this indicating the extent to which the integrating component has changed over time in the past during the predetermined time window. Depending on the dynamic value, the division ratio is determined according to which the integrating component is converted into the control path of the internal combustion engine by means of control interventions and the control interventions into the control path of the electric motor in the second operating mode.

This has the advantage that the fast response time of the electric motor can, if necessary, also be used for the integrating component, in order, for example, to prevent the engine from shutting down, while in a steady-state operating mode the integrating component is applied via the torque of the internal combustion engine and no longer-term interventions by the electric motor that are unfavorable in terms of energy are required in generator or motor mode.

The dynamic value can evaluate the rate of change of the integrating component over time within a short preceding time window. A high dynamic value can be present, for example, if the integrating component of the idle controller has to react quickly to a disturbance variable in order, for example, to prevent the engine from shutting down in the event of a significant underspeed. On the other hand, there can be a low dynamic value if the integrating component of the idle controller compensates for errors in the torque balance in a steady state and has a value that is constant or almost constant over time. The dynamic value can be determined, for example, by feeding the undivided integrating component of the idle controller into a D-T1 filter or into a filter with a similar step response, the dynamic value being the output value of the filter.

When there is a dynamic value in a high predetermined range, changes in the integrating component can be implemented via the control path of the electric motor, while with a dynamic value in a low predetermined range, changes in the integrating component are implemented via the control path of the internal combustion engine. When there is a low dynamic value, the existing integrating component for the control path of the electric motor can, for example, be returned to zero via a ramp, the ramp gradient being predetermined as a function of the dynamic value.

An aspect of the invention also comprises the idling control device for a motor vehicle, which device is configured to carry out one of the methods according to the invention.

An aspect of the invention also comprises a motor vehicle with an idling control device.

Aspects of the invention also include further developments of the device according to the invention and of the motor vehicle according to the invention which have features such as have already been described in connection with the further developments of the method according to the invention. For this reason, the corresponding further developments of the method according to the invention are not described here again.

BRIEF DESCRIPTION OF THE DRAWINGS

An exemplary embodiment of the invention is described below. In this respect, in the figures.

DETAILED DESCRIPTION OF THE PREFERRED EMBODIMENTS

The exemplary embodiment explained below is a preferred embodiment of the invention. In the exemplary embodiment, the described components of the embodiment each represent individual features of the invention that should be considered independently of one another, and that each also develop the invention independently of one another and can therefore also be considered to be part of an aspect of the invention, either individually or in a combination other than that shown. Furthermore, the described embodiment may also be supplemented by further features of the invention that have already been described.

In the figures, elements with the same function are each provided with the same reference symbols.

Figure 1:
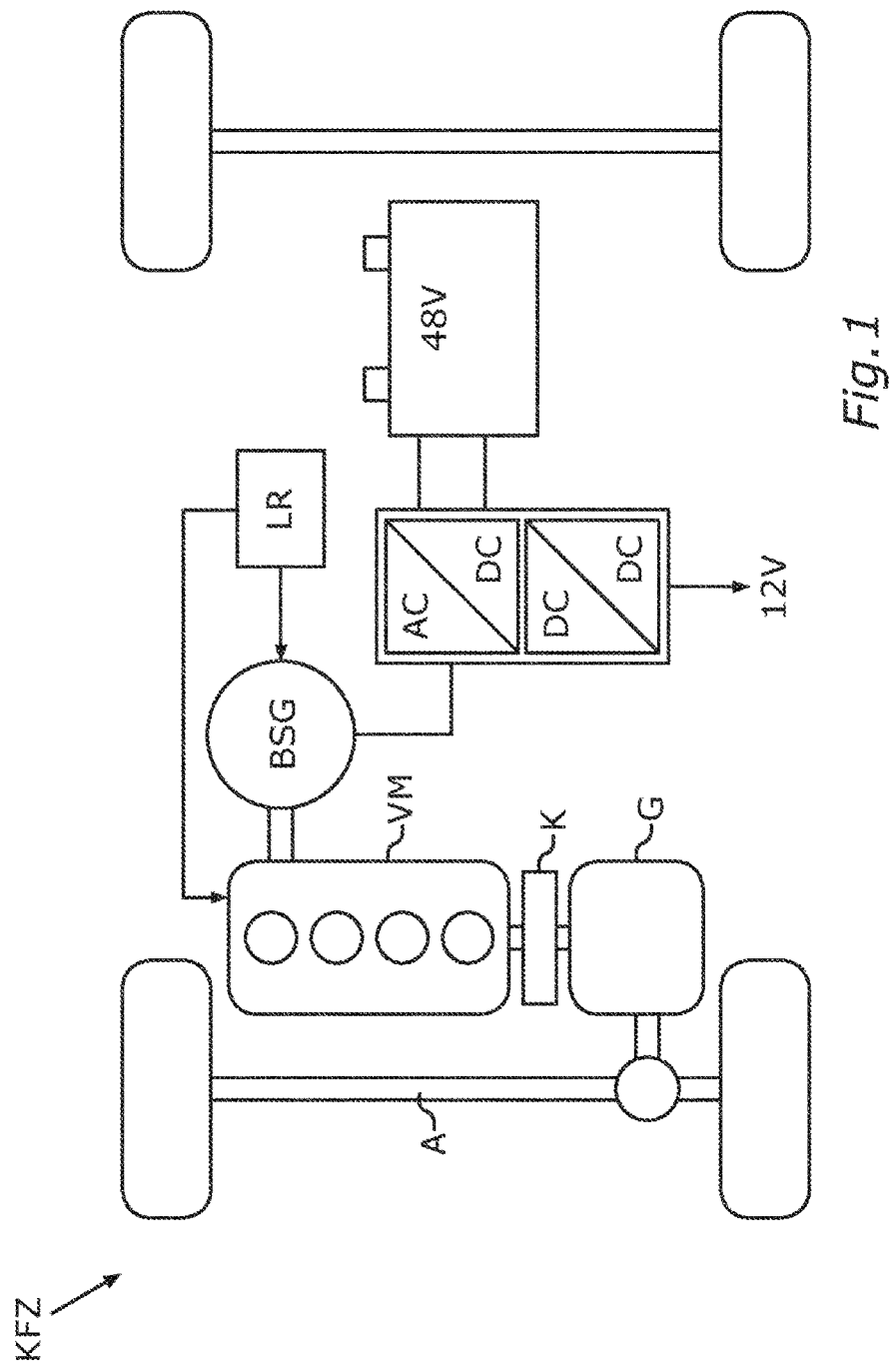
FIG. 1 shows a schematic view of a motor vehicle with an idling control device according to an aspect of the invention.

An idling control device LR can be used in all hybrid systems in which an internal combustion engine VM interacts with an electric machine or an electric motor BSG. If necessary, a total setpoint torque gs must be maintained during the operation of the hybrid system in an idling state if there is no requested total setpoint torque gms. A typical example of the use of a hybrid system is a so-called hybrid vehicle, in which both an internal combustion engine and an electric machine are used to drive. Such a motor vehicle Kfz is shown schematically in FIG. 1 with a chassis and a drive train. The drive train has an internal combustion engine VM, which delivers its torque via a clutch K and a transmission G to a drive axle A of the chassis. The motor shaft of the internal combustion engine VM is coupled to an electric machine, which is embodied here as a belt starter generator BSG. There is thus an exemplary operative connection between the internal combustion engine VM and the electric machine.

In the present example, the electric motor BSG or the belt starter generator BSG is supplied by a 48 V battery via a DC/AC inverter. A DC/DC rectifier connected to the inverter or the 48 V network can be used, for example, to generate a 12 V network for supplying additional consumers in the motor vehicle. The motor vehicle Kfz can include the energy store E for supplying the electric motor BSG.

In addition to the drive function, the electric motor BSG also has the function of a generator. It can be used in connection with both gasoline engines and diesel engines. With it, for example, a start-stop functionality and thus a mild hybrid system can be implemented.

In particular, torque assistance by the electric machine, for example the belt starter generator BSG, can be used for the idling mode of the internal combustion engine VM. For this purpose, the motor vehicle has an idling control device LR, which can also be referred to as an idle controller. It influences the torque generation by both the internal combustion engine VM and the electric motor BSG.

The Idling Control Device

The idling control device can specify the total setpoint torque gs, which is composed of the setpoint torque of the internal combustion engine vs and the setpoint torque of the electric motor es. In the predetermined idling mode, which can be detected, for example, by means of a position of the accelerator pedal, the total setpoint torque gs or the setpoint torque of the internal combustion engine vs can have a predetermined idling torque. The total setpoint torque gs can represent a torque to be set, which is to be set without or before a request for the requested total setpoint torque gms by the idling control device LR. The total setpoint torque gs can be set by the idling control device LS via the fast vrs and the slow path vrl of the internal combustion engine and/or the control path ers of the electric motor. The adjustment is carried out, for example, as a function of the operating mode. If a requested total setpoint torque gms is requested, the idling control device LR can set this by means of the control interventions via the control paths ers, vrs, vrl. A requested total setpoint torque gms can be, for example, a total setpoint torque for starting the motor vehicle or a total setpoint torque which is intended to prevent the internal combustion engine BSG from stalling.

In the first operating mode, the requested total setpoint torque gms can only be set via the control path yr of the internal combustion engine by means of the at least one control intervention. This can mean that the requested total setpoint torque gms is only set by interventions vrs, vrl in control paths of the internal combustion engine. In order to enable intervention in the fast control path vrs of the internal combustion engine, it may be necessary for the internal combustion engine BSG to be operated in the first operating mode with the first torque reserve. The first torque reserve of the internal combustion engine BSG can be brought about, for example, by excess charging in combination with a late ignition point of the cylinder. An intervention in the fast path vrs of the internal combustion engine can represent a change in the point in time that is shifted to an earlier ignition point. The torque of the internal combustion engine can thus be increased with a relatively short delay or a high rate of change over time.

In the second operating mode, it can be provided that the requested total setpoint torque gms is set by means of at least one control intervention via the control path yr of the internal combustion engine and by means of at least one control intervention via the control path er of the electric motor. The control intervention via the control path yr of the internal combustion engine can include at least one predetermined slow control intervention vrl and the control intervention in the control path er of the electric motor can include at least one predetermined fast control intervention. The requested total setpoint torque gms can thus be set by means of the internal combustion engine VM and the electric motor BSG. The fast control intervention can be carried out, for example, by changing the voltage of the electric motor BSG. A fast control intervention by means of the internal combustion engine VM may not be necessary in the second operating mode, for example. It can thus be possible for the internal combustion engine VM to be operated with the second torque reserve before the requested total setpoint torque gms is set. The second torque reserve can be less than the first torque reserve. The ignition point can, for example, also be set at the optimum ignition point, whereby the second torque reserve can be 0, for example.

The internal combustion engine VM can have a characteristic which has the effect that without a torque reserve it runs stably only with predetermined setpoint torques. When the motor vehicle is in the predetermined idling mode, the total setpoint torque gs may be smaller than the torque of the internal combustion engine, which permits stable operation. In this case, it can be provided that, in the second operating mode, the setpoint torque of the electric motor is set without control intervention in such a way that it has the predetermined basic generator torque egs. In this case, for example, the electric motor BSG can act as a generator and have a negative torque as the setpoint torque es. The setpoint torque vs of the internal combustion engine can be increased by the predetermined basic generator torque egs, whereby, for example, the torque that permits stable operation of the internal combustion engine is achieved.

It can also be provided that the idling control device LR determines the predetermined basic generator torque egs as a function of the predetermined setpoint operating point of the internal combustion engine. For this purpose, for example, a characteristic diagram can be stored in the idling control device LR. The idling control device LR can use the characteristic diagram to set the basic generator torque egs in such a way that the internal combustion engine VM is operated at the predetermined setpoint operating point.

In the predetermined idling mode it can be provided that the internal combustion engine VM is operated in the first operating mode and in the second operating mode with the same charge quantity.

Figure 2:
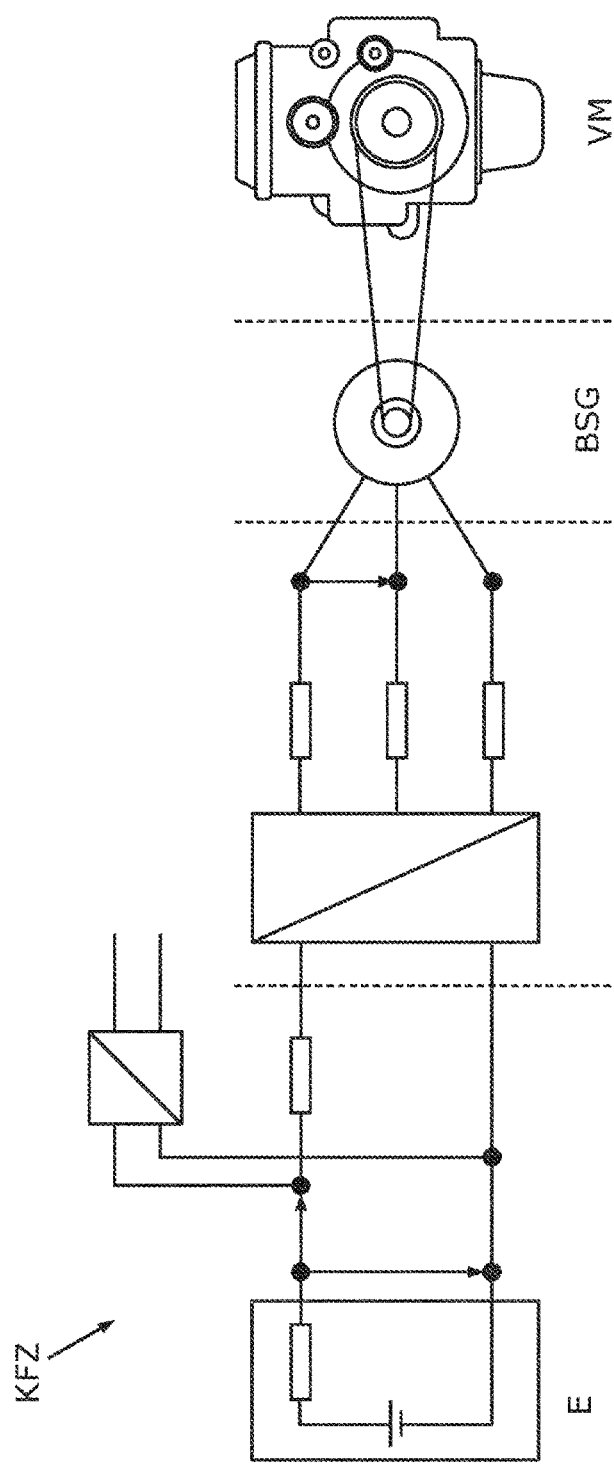
FIG. 2 shows a schematic view of a motor vehicle with an electric motor and an internal combustion engine.

FIG. 2 shows a schematic drawing of a connection between the electric motor BSG and the internal combustion engine VM.

Electrical energy can be generated by operating the electric motor BSG with the predetermined basic generator torque egs. It may be necessary here to store electrical energy in the energy store E. This process can be ruled out if the energy store E of the motor vehicle can no longer take up electrical energy. For this purpose, it can be provided that the setpoint state of charge of the energy store E is increased by the idling control device LR when the idling control device LR is operated in the second operating mode. Thus, the capacity of the energy store E can be increased and the second operating mode can be operated for longer.

The idling control device LR can belong to a hybrid system and operate in at least two different operating modes, wherein the control interventions can be carried out exclusively by means of the internal combustion engine VM in a first operating mode, and fast control interventions can take place by means of the electric motor BSG and slow control interventions can take place by means of the internal combustion engine VM in a second operating mode.

In the first operating mode, the internal combustion engine VM can build up a torque reserve in order to be able to achieve a rapid torque increase, while in the second operating mode the internal combustion engine VM can operate without a torque reserve or with a significantly reduced torque reserve. In the first operating mode, the internal combustion engine's torque reserve can be represented by an excess of charge in combination with a retarded ignition point. In the second operating mode, the internal combustion engine VM can be operated with an ignition point that is optimal for the current charge. In the second operating mode, the electric motor BSG can take up at least one predetermined basic generator torque egs without control interventions, and the internal combustion engine VM can output a corresponding increased torque.

The basic generator torque egs can be selected such that the internal combustion engine VM operates at a favorable operating point with regard to the stability of the combustion process. This also allows an optimized camshaft strategy, with the following additional consumption advantages. The basic generator torque egs can be selected such that the internal combustion engine VM operates at a predetermined operating point that is favorable with regard to acoustics or vibrations. The basic generator torque egs can be selected such that the internal combustion engine EM can be operated in a steady-state fashion with the same charge in the first and second operating modes. This basic generator torque egs can also ensure safety if the high-voltage system fails and has to be switched to the first operating mode, because in this case there is enough charge to maintain the idling speed. In the second mode, a low-voltage battery from a high-voltage system can be charged to a higher state of charge than in the first operating mode, in particular if the state of charge of the high-voltage system exceeds a predetermined threshold.

If the state of charge of the high-voltage system increases too much, charging of the 12 V battery can be activated in order to avoid the idling control device LR having to switch back to the first operating mode.

The operation of the idling control device LR in the first operating mode or in the second operating mode can be dependent on predetermined operating states of the motor vehicle. In this way, predetermined operating states can be assigned in the first operating mode and predetermined operating states can be assigned to the second operating mode. The idling control device LR can set the respective operating mode as a function of the operating state of the motor vehicle.

Conditions for the Operation of the Idling Control Device in the Second Operating Mode The idling control device LR can preferably operate in the second operating mode when a state of charge of one or more electrical energy stores E is within a predetermined range.

The idling control device LR can preferably operate in the second operating mode when an increased torque output of the internal combustion engine VM is required for operating one or more mechanically driven auxiliary units and/or for supplying electrical consumers by means of the electric motor. One of the mechanically driven auxiliary units can be an air conditioning compressor.

The idling control device LR can, for example, only operate in the second operating mode if no predetermined increased exhaust gas temperature is required for heating up an exhaust gas treatment system. The second operating mode can, for example, only be activated in predetermined states of the drive train [e.g. open drive train or defined gears]. The second operating mode can, for example, be activated only if a predetermined time has elapsed since the start of the internal combustion engine VM. The second operating mode can, for example, be activated only at the beginning of an activation phase of the idle controller in order to minimize possible noticeable effects during the transition between the operating modes.

The idling control device LR can select the operating mode as a function of predetermined operating states of the motor vehicle. Possible operating states are given as examples. This can be a starting situation, a state of possible engine shutdown or an idling state.

Use for Providing Starting Assistance

The idle controller LR can be activated or kept active and a transition to the second operating mode can preferably take place when a starting situation is detected. In this case, during the starting situation, the idle controller LR can adjust the engine speed to a setpoint speed that is higher than in the idling mode.

Use for Providing Protection Against Engine Shutdown

A transition to the second operating mode can take place, for example, when the risk of the engine shutting down is detected. The risk of the engine shutting down can be detected, for example, from the fact that the engine speed is a predetermined amount below a setpoint speed and/or exceeds an engine speed gradient in the negative direction by a predetermined amount (this can be implemented, for example, as an underspeed threshold depending on the speed gradient). After a transition to the second operating mode, a return to the first operating mode can take place because of a detected risk of the engine shutting down if the conditions for possible shutting down of the engine are no longer present for a predetermined time.

In the event of an imminent engine shutdown, it can be provided that there is no transition to the second operating mode when the drive train is closed and the driver operates the brake. It can be provided that no control interventions take place by means of the electric machine if the engine speed drops below a predetermined threshold. This serves to protect a dual mass flywheel (DMF), which can be destroyed due to resonance if the speed is in a certain low range below the idling speed for a relatively long time.

It can be provided that parameters which are used by the idling control device LR are dependent on the respective operating mode. The parameters can relate, for example, to the controller constants of a proportional, differentiating or integrating controller component. In order to enable a smooth transition between the operating modes when changing the operating mode, it can be provided that the idling control device LR is operated in a predetermined transition mode when the operating mode changes, wherein the values of the torque reserve and/or the parameters used by the idling control device LR change constantly. It can be provided, for example, that specific values such as the torque reserve or the limits of permissible ranges of the parameters change continuously during the transition mode from the value of the initial operating mode to the value of the following operating mode.

Transitions Between the Two Operating Modes

During the transition between the first and second operating mode, there can be continuous cross-fading between the control interventions at the internal combustion engine and the electric motor. During the transition between the first and second operating mode, continuous cross-fading between the values of the basic generator torque and the torque reserve of the internal combustion engine can take place in the two modes. Switching from the second operating mode to the first operating mode can take place without a continuous transition if there is a fault in the electric motor or in a high-voltage system to which the electric motor is connected (in this sense, high-voltage includes a voltage >12V, e.g. 48V)

Controller Structure

Figure 3:
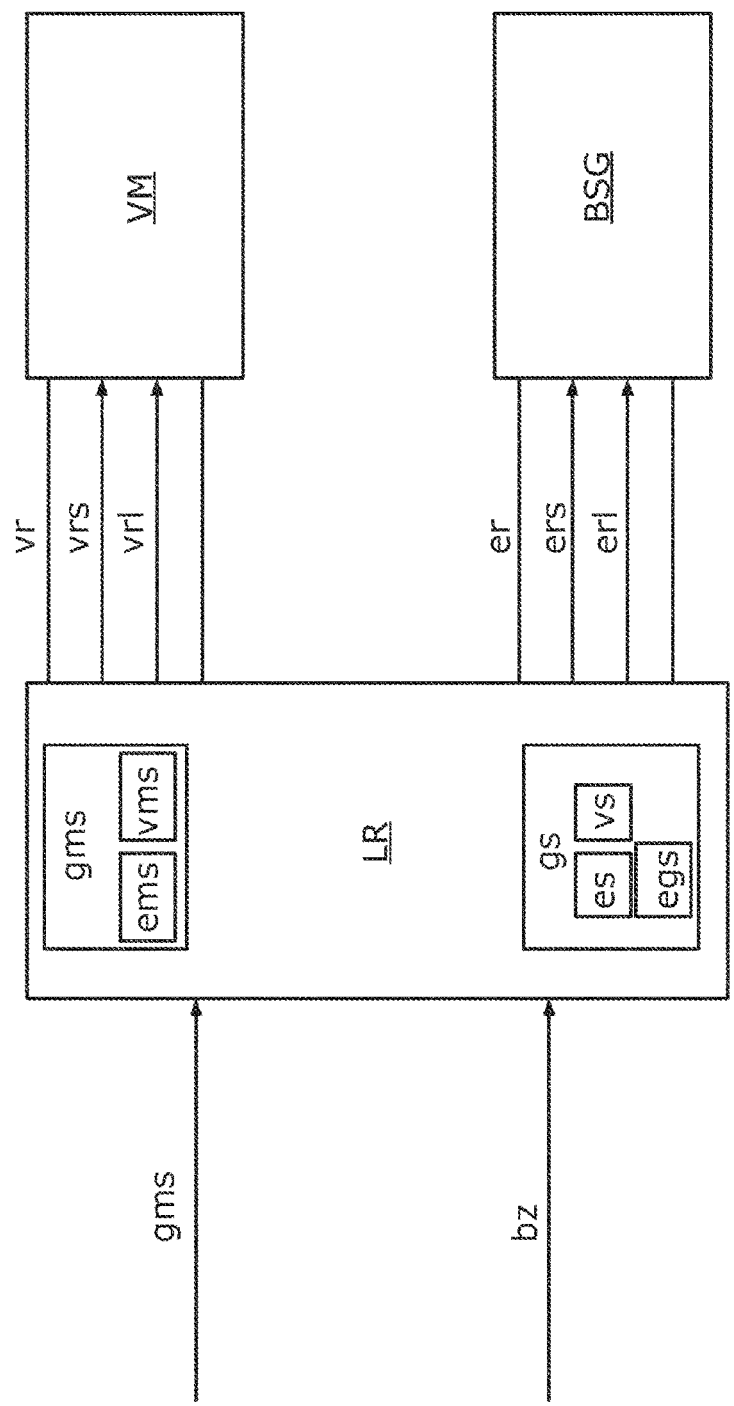
FIG. 3 shows a schematic representation of the control paths.

FIG. 3 shows a diagram of a possible controller structure. The idling control device LR can determine the total setpoint torque gs, which is composed of the setpoint torque of the electric motor and the setpoint torque of the internal combustion engine. The idling control device can set the setpoint torques vs, es via the control path yr of the internal combustion engine and the control path er of the electric motor. The control paths er, yr can include the slow control paths vrl and the fast control paths ers, vrs. The idling control device LR can receive a signal relating to the operating state bz of the motor vehicle and then activate the respective operating state. The idling control device LR can receive the requested total setpoint torque gms and determine the corresponding setpoint torques of the electric motor after the control intervention ems and of the internal combustion engine vms. In order to set the requested total setpoint torque gms, the idling control device can carry out the control interventions in the control paths vr, er.

It can be provided that the idling control device LR calculates the rapid control interventions in the second operating mode in a time-synchronous manner and in the first operating mode in an angle-synchronously calculated manner. In the second operating mode, the idling control device LR can convert a proportional and/or differentiating component into the control path er of the electric motor by means of the at least one control intervention.

In the second operating mode, an integrating component can be implemented by means of the at least one control intervention into the control path yr of the internal combustion engine and the integrating component can be implemented by means of control interventions into the control path yr of the internal combustion engine and the control path er of the electric motor, the division ratio of the integrating component being dependent on a dynamic value.

Depending on whether the idling control device LR is operating in the first or second operating mode, the idling control device LR can use different sets of parameters. Fast control interventions in the second operating mode can be calculated time-synchronously (i.e. with a constant repetition rate, for example every 10 ms), while in the first operating mode they are calculated angle-synchronously (i.e. repetition rate proportional to the speed of the internal combustion engine VM, in particular with a segment-synchronous calculation of the fast control interventions). A segment duration is the duration of one work cycle of the internal combustion engine, i.e. two revolutions per number of cylinders. In the second operating mode, a proportional and/or differentiating component of the idle controller can be implemented by means of the electric motor. In the second operating mode, an integrating component of the idle controller can be implemented by means of the internal combustion engine VM and an integrating component of the idle controller LR can be implemented partly by means of the internal combustion engine VM and partly by means of the electric motor BSG, with the entire integrating component of the idle controller being implemented via the internal combustion engine VM under constant conditions in the long term. In the second operating mode, the dynamics of the entire integrating component can be evaluated and, when there are high dynamics, the change in the integrating component can be implemented by means of the electric motor BSG. When there are low dynamics, the portion converted by means of the electric motor BSG can be adjusted toward zero. The assessment of the dynamics of the entire integrating component can for example take place via a D-T1 filter or an algorithm with a similar step response. The portion of the integrating component converted by means of the electric machine BSG can be returned to zero by means of ramps, with a gradient being predetermined as a function of a dynamic value of the entire integrating component.

An aspect of the invention provides a method which is optimized by a coordinated use of the idling control device by the internal combustion engine VM and the electric machine BSG. The method is intended to enable idling control in all operating situations, the respective best operating mode becoming effective depending on the situation. The method can be used in the same way for optimized starting assistance and for optimized protection against engine shutdown. In the case of gasoline engines, an aspect of the invention disclosure is also intended to ensure stable engine operation under conditions that are optimal for consumption.

Overall, the example shows how an aspect of the invention provides coordinated use of the idling control device LR by an internal combustion engine and an electric motor, the best operating mode being selected as a function of a predetermined operating situation.

LIST OF REFERENCE DESIGNATIONS

Kfz Motor vehicle
A Drive axle
BSG Electric motor
ems Setpoint torque of the electric motor with control intervention
es Setpoint torque of the electric motor without control intervention
gs Total setpoint torque
egs Basic generator torque
gms Requested total setpoint torque
er Control path of the electric motor
yr Control path of the internal combustion engine
ers Fast control intervention by means of the electric motor
vrs Fast control intervention by means of the internal combustion engine
erl Slow control intervention by means of the electric motor vrl Slow control intervention by means of the internal combustion engine
G Transmission
K Clutch
LR Idling control device
vms Setpoint torque of the internal combustion engine with control intervention
vs Setpoint torque of the internal combustion engine without control intervention control intervention
VM Internal combustion engine
bz Signal for the operating state of the motor vehicle
E Electrical energy storage

The invention claimed is:

1. A method for operating an idling control device for a motor vehicle, wherein the idling control device:
specifies a total setpoint torque comprising a setpoint torque of an electric motor and a setpoint torque of an internal combustion engine which interacts with the electric motor, and
sets the setpoint torques in the electric motor and the internal combustion engine by means of respective control paths,
wherein:
in a first operating mode the idling control device sets a requested total setpoint torque only via the control path of the internal combustion engine by means of at least one control intervention,
in a second operating mode the idling control device sets the requested total setpoint torque by means of at least one control intervention via the control path of the internal combustion engine and by means of at least one control intervention via the control path of the electric motor,
the control interventions via the control path of the internal combustion engine include at least one predetermined slow control intervention, and the control interventions in the control path of the electric motor include at least one predetermined fast control intervention, which intervenes with a higher rate of change over time than the at least one predetermined slow control intervention by means of the internal combustion engine, and
in the second operating mode:
the setpoint torque of the electric motor without control intervention has at least one predetermined basic generator torque, and
the setpoint torque of the internal combustion engine without control intervention has at least the basic generator torque as the setpoint torque when the motor vehicle is in a predetermined idling mode.

2. The method as claimed in claim 1, wherein
in the first operating mode the idling control device operates the internal combustion engine without control intervention with a predetermined first torque reserve, and
in the second operating mode the idling control device operates the internal combustion engine without control intervention, either without a torque reserve or with a predetermined second torque reserve, wherein the predetermined second torque reserve is smaller than the predetermined first torque reserve.

3. The method as claimed in claim 1, wherein the idling control device determines the predetermined basic generator torque as a function of a predetermined setpoint operating point of the internal combustion engine.

4. The method as claimed in claim 1, wherein the internal combustion engine is operated in the first operating mode and in the second operating mode with the same charge per combustion cycle when the motor vehicle is in the predetermined idling mode.

5. The method as claimed in claim 1, wherein the idling control device specifies a setpoint state of charge of an electrical energy store, wherein the setpoint state of charge is higher in the second operating mode than in the first operating mode.

6. The method as claimed in claim 1, wherein the first operating mode and the second operating mode are assigned respective predetermined operating states of the motor vehicle, and the idling control device operates in the first operating mode or in the second operating mode as a function of the predetermined operating states of the motor vehicle.

7. The method as claimed in claim 6, wherein the second operating mode is activated or kept active when a predetermined starting situation of the motor vehicle and/or a predetermined situation of an imminent shutdown of the internal combustion engine is detected.

8. The method as claimed in claim 1, wherein the idling control device uses parameters which are dependent on the respective operating mode.

9. The method as claimed in claim 8, wherein the idling control device is operated in a predetermined transition mode when the operating mode changes, wherein
the values of the torque reserve and/or the parameters used by the idling control device change constantly from those of the original operating mode to those of the following operating mode, and/or
the control interventions are multiplied by means of respective activity factors, wherein the activity factors constantly change from those of the original operating mode to those of the following operating mode.

10. The method as claimed in claim 1, wherein in the second operating mode the idling control device converts a proportional and/or differentiating component into the control path of the electric motor by means of the at least one control intervention.

11. The method as claimed in claim 1, wherein in the second operating mode the idling control device converts an integrating component into the control path of the internal combustion engine by means of the at least one control intervention.

12. The method as claimed in claim 1, wherein in the second operating mode the idling control device converts the integrating component into the control path of the internal combustion engine and the control path of the electric motor by means of control interventions, wherein a division ratio of the integrating component is dependent on a dynamic value.

13. An idling control device for a motor vehicle, configured to carry out the method as claimed in claim 1.

14. A motor vehicle with an idling control device as claimed in claim 13.

15. A method for operating an idling control device for a motor vehicle, wherein the idling control device:
specifies a total setpoint torque comprising a setpoint torque of an electric motor and a setpoint torque of an internal combustion engine which interacts with the electric motor, and
sets the setpoint torques in the electric motor and the internal combustion engine by means of respective control paths, wherein:
in a first operating mode the idling control device sets a requested total setpoint torque only via the control path of the internal combustion engine by means of at least one control intervention,
in a second operating mode the idling control device sets the requested total setpoint torque by means of at least one control intervention via the control path of the internal combustion engine and by means of at least one control intervention via the control path of the electric motor,
the control interventions via the control path of the internal combustion engine include at least one predetermined slow control intervention, and the control interventions in the control path of the electric motor include at least one predetermined fast control intervention, which intervenes with a higher rate of change over time than the at least one predetermined slow control intervention by means of the internal combustion engine, and
in the second operating mode the idling control device calculates the fast control interventions in a time-synchronous manner and in the first operating mode in an angle-synchronous manner with an angle of a drive element of the motor vehicle.

* * * * *